Patented Jan. 13, 1942

2,269,990

UNITED STATES PATENT OFFICE 2,269,990

POLYVINYL HALIDE COMPOSITION

Moyer M. Safford, Schenectady, N. Y., assignor to General Electric Company, a corporation of New York No Drawing. Application June 8, 1940,
Serial No. 339,528

9 Claims. (Cl. 260—36)

This invention relates to polyvinyl halide compositions, and more particularly to plasticized polyvinyl halides.

Polyvinyl halides, such as polyvinyl chloride, for example, are ordinarily mixed with plasticizers in order to produce synthetic rubber-like compositions. Semon Patent No. 1,929,453 discloses several compounds which may be used as plasticizers for polyvinyl halides, but the most common one in use is tricresyl phosphate which is usually added in large proportion to the polyvinyl halide in order effectively to plasticize it.

I have found that the methyl chlor stearates are excellent plasticizers for polyvinyl halides. These compounds are relatively cheap, give a plasticized product of tensile strength comparable to those polyvinyl halides plasticized with tricresyl phosphate, impart good low temperature flexibility, and are otherwise generally advantageous additions to polyvinyl halides.

Esters of the higher fatty acids do not exert an appreciable plasticizing action on polyvinyl halides. For instance methyl stearate does not plasticize polyvinyl chloride. The methyl chlor stearates, I have found, exert a marked plasticizing action on polyvinyl halides. I have further observed that an improved plasticizing action occurs as the amount of chlorine introduced into the molecule increases. Moreover, while the introduction of two chlorine atoms into methyl stearate produces a composition which acts as a plasticizer for polyvinyl halides the plasticizer tends to separate from the product. In order to obtain a satisfactory plasticized polyvinyl halide, I have found that the methyl chlor stearate for practical use as a plasticizer for polyvinyl halides should contain 3 to 6 atoms of chlorine in the molecule. Six atoms of chlorine in the methyl stearate molecule appears to be the upper practical limit. Polyvinyl chloride, for example plasticized with methyl hexachlor stearate, is an excellent product although it is not quite as flexible as polyvinyl chloride plasticized with methyl pentachlor stearate.

The methyl chlor stearates may be added to the polyvinyl halide in various proportions and in amounts corresponding generally to the amounts of tricresyl phosphate ordinarily added to polyvinyl halide to produce the plasticized product. Furthermore, the methyl chlor stearates may be mixed with other plasticizers for the polyvinyl halide, such as tricresyl phosphate, and with the usual fillers employed with polyvinyl halide compositions.

The methyl chlor stearates are also miscible with acetylated castor oil and may therefore be admixed with such material to produce compositions of the character disclosed in Agens Patent No. 2,156,956.

Polyvinyl halide compositions plasticized with methyl chlor stearates may be electrically stabilized by the addition of various electrical stabilizers, for example lead oxide as disclosed in Safford Patent No. 2,118,017. In addition a variety of other lead salts may be used as electrical stabilizers including compounds which ordinarily do not act as electrical stabilizers when tricresyl phosphate is the plasticizer for the polyvinyl halide.

The following table illustrates the effect of various compounds as electrical stabilizers for plasticized polyvinyl chloride. In each case 6 parts of stabilizer were incorporated into 94 parts of plasticized polyvinyl chloride whose composition was 40% plasticizer and 60% polyvinyl chloride.

| Stabilizer | Loss factor (E″)* | |
| --- | --- | --- |
| | Plasticizer: methyl hexachlor stearate | Plasticizer: tricresyl phosphate |
| Lead acetate | 0.33 | 8.35 |
| Lead stearate | 1.5 | 25.0 |
| Lead oleate | 2.3 | 17.0 |
| Lead salt linseed acids | 1.15 | 32.3 |
| Lead palmitate | 1.11 | 11.9 |
| Lead oxide | 1.20 | 2.54 |
| Lead carbonate | 2.72 | 54.5 |
| Lead hydroxide | 1.07 | 8.25 |
| Lead silicate | 0.91 | 11.5 |
| Lead phosphate | 1.07 | 73.3 |
| Basic lead carbonate | 1.71 | 48.5 |
| Pb₃O₄ | 17.1 | 39.8 |

*60 cycles, 90° C. loss factor calculated from D. C. resistivity $(\rho)$ by means of the equation $$E'' = \frac{3 \times 10^{10}}{\rho}$$

It has also been found that where acetylated castor oil is used with the polyvinyl halide compositions the methyl chlor stearates greatly improve the life and electrical properties of the plasticized stabilized product.

It has further been found in using the methyl chlor stearates as plasticizers that the electrical losses of the product decrease with an increased amount of chlorine in the molecule when using a given amount of stabilizer. Thus, methyl hexachlor stearate appears to be the best plasticizer from an electrical standpoint.

What I claim as new and desire to secure by Letters Patent of the United States is:

1. A composition comprising polyvinyl halide and a methyl chlor stearate having at least 3 chlorine atoms in the molecule.

2. A composition comprising polyvinyl chloride and a methyl chlor stearate having 3 to 6 chlorine atoms in the molecule.

3. A composition comprising polyvinyl halide, a methyl chlor stearate having 3 to 6 chlorine atoms in the molecule and acetylated castor oil.

4. A composition comprising polyvinyl halide, a methyl chlor stearate having 3 to 6 chlorine atoms in the molecule, acetylated castor oil and an electrical stabilizer.

5. A composition comprising polyvinyl chloride, a methyl chlor stearate having 3 to 6 chlorine atoms in the molecule, acetylated castor oil and an electrical stabilizer.

6. A composition comprising polyvinyl halide and methyl hexachlor stearate.

7. A composition comprising polyvinyl halide and methyl pentachlor stearate.

8. A composition comprising polyvinyl halide and methyl trichlor stearate.

9. A composition comprising polyvinyl chloride, a methyl chlor stearate having 3 to 6 chlorine atoms in the molecule, and an electrical stabilizer.

MOYER M. SAFFORD.